Figure 1:
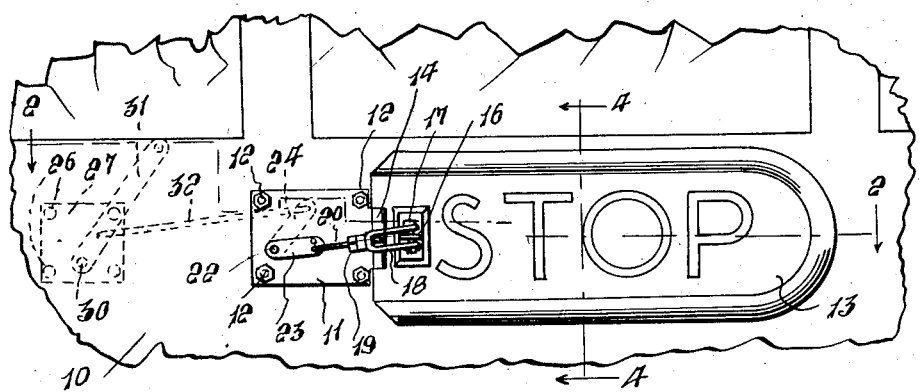

Jan. 30, 1940.     C. E. GAYNON     2,188,835

STOP SIGNAL

Filed Aug. 25, 1938

Inventor
Claude E. Gaynon
By L. F. Landreth
Attorney

Patented Jan. 30, 1940

2,188,835

UNITED STATES PATENT OFFICE 2,188,835

STOP SIGNAL

Claude E. Gaynon, Jacksonville, Fla.

Application August 25, 1938, Serial No. 226,797

2 Claims. (Cl. 116—52)

This invention relates to an improved stop signal adapted to be used on road vehicles in general and on school buses in particular.

The rural sections of most States now transport children to and from school by motor bus and the counties employing this system usually have traffic laws forbidding motorists to pass a school bus in either direction when it is stopped for loading or unloading children, so that the children may safely cross the highway while the traffic is stopped.

It is a primary object of this invention to provide a signal particularly adapted for school buses which will indicate to drivers of other vehicles approaching the bus from either direction, while it is not in motion, that the bus must not be passed to insure the safety of those children who are required to cross the highway to reach their homes.

More particularly, it is an aim of this invention to provide a signaling element adapted to be hinged to the outer side of a motor vehicle and to be connected to a crank disposed in the cab of the vehicle whereby the signaling element may be moved by the driver of the vehicle from an inoperative position, against the side of the bus, to an operative position at right angles to said side, and back to its inoperative position.

Still a further object of the invention is to provide means whereby the signaling element will be automatically retained against movement in either its inoperative position or operative position until actuated by a lever positioned adjacent the driver's seat.

Other objects and advantages of the invention will hereinafter become more fully apparent from the following description of the drawing, which illustrates a preferred form of the invention, and wherein—

Figure 2:
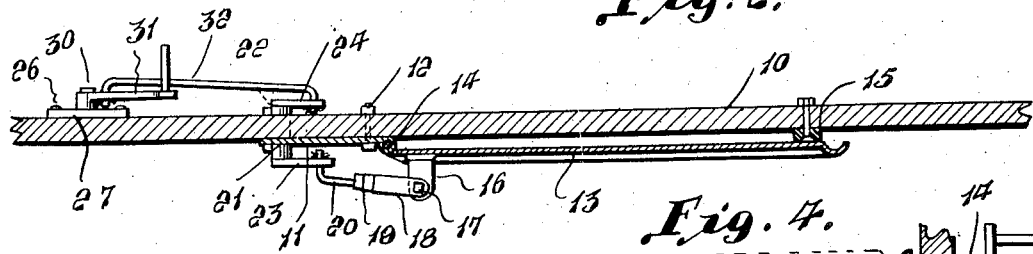
Figure 4:
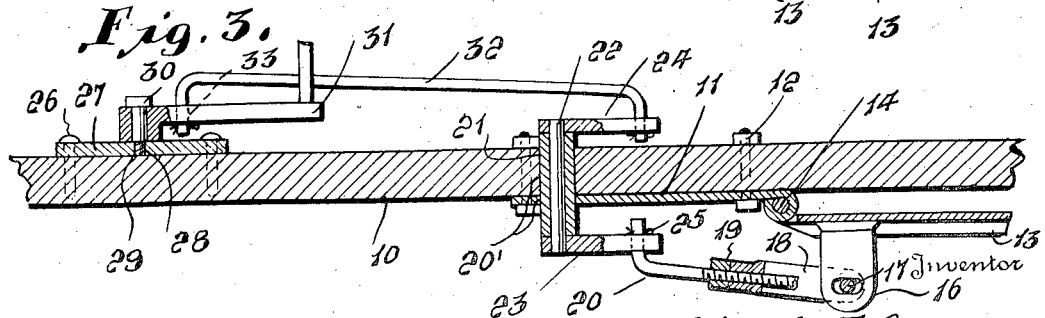
Figure 3:
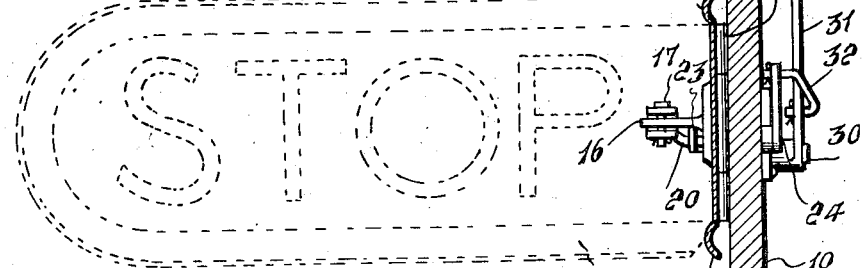

Figure 1 is a side elevational view showing the invention applied to a bus, shown fragmentarily, and positioned in its inoperative position, Figure 2 is a horizontal sectional view taken on the line 2—2 of Figure 1, Figure 3 is an enlarged horizontal sectional view partly in elevation showing the operating means for the signaling element, and Figure 4 is a vertical sectional view taken on the line 4—4 of Figure 1 and with the signaling element, shown in dotted lines, in its operative position.

Referring more particularly to the drawing, wherein like reference characters designate like or corresponding parts throughout the different views, 10 designates generally a portion of the left hand side of a motor vehicle to the outer side of which is secured the plate 11 by means of the fastenings 12 which extend therethrough and through the side 10.

A signaling plate or board designated generally 13 is hinged at one of its ends, as indicated at 14 to one end of the plate 11, and as seen in Figures 1 and 2 lies substantially parallel to the outer side of the side 10 and is held out of engagement therewith by the bumper 15 which is secured to the side 10 and which engages against the free end of the plate 13. The plate 13 extends, preferably, toward the rear of the vehicle to which it is attached, when in a closed position and is provided with an outwardly extending apertured lug 16 adjacent its hinged end which is loosely connected by means of the bolt 17 to the free ends of the fork 18, the shank 19 of which is provided with a threaded bore to receive the threaded end of the rod 20.

Plate 11 and the side 10 are provided with the alined openings 20' in which is journaled the bushing 21 which journals the shaft 22, the opposite ends of which project beyond the ends of the bushing. The crank arms 23 and 24 are keyed to the opposite ends of the shaft 22 and are provided with openings adjacent their free ends. Crank arm 23, which is disposed on the outer side of the vehicle, has the opposite end of the rod 20 extending through its opening and connected thereto by means of a cotter pin 25. This end of the rod 20 is bent relatively to its intermediate portion and threaded end and is pivotally mounted in the opening of the crank arm 23.

Secured to the inner side of the wall 10, by means of the fastenings 26 is a plate 27 provided with a threaded opening 28 in which is mounted the threaded end 29 of a headed bolt 30 on which is journaled a crank lever 31. A rod 32 has its opposite ends bent substantially at right angles to its intermediate portion with one of said ends pivotally connected in the opening of the crank arm 24 and the opposite end pivotally connected in an opening 33 in the shank of the crank lever 31 to connect the lever 31 and the crank arm 23.

The lever 31 is adapted to be positioned adjacent the driver's seat of the motor vehicle to which the signaling apparatus is attached so that the driver by swinging the lever 31 forward will swing the crank arms 23 and 24 forward to swing the signaling plate 13 outwardly and forwardly to a position substantially at right angles to the side of the vehicle. When the plate 13 is thus extended in its open or operative position, the lever 31 will be extending forward so that the link 32 will be disposed substantially across the pivot 30 or at or slightly past a dead center position to retain plate 13 extended until the lever 31 is swung upwardly and back to its position as seen, in dotted lines, in Figure 1. When plate 13, is in its inoperative position as seen in Figures 1 and 2, the pivot connection of crank arm 23 and rod 20 is slightly below the dead center of the shaft 22 and the lug 16 to retain plate 13 in engagement with the bumper 15 until released by an upward and forward movement of the lever 31. It will thus be seen, that the plate 13 will be held either in a retracted or extended position until actuated by manual movement of the crank lever 31.

Plate 13 is preferably colored on both sides in a color to contrast with the words "Stop" which are written on both sides thereof and in letters which extend substantially the length of the plate 13 to be clearly visible to drivers approaching the bus from either direction so that when the signal is in its extended position it will serve as an ample warning that the vehicle to which the signal is attached is not to be passed, from either direction. Plate 13 may be of any desired length and is preferably of sufficient length so that when it is in its open extended position it will extend partway, at least, into the lane of the road reserved for traffic moving in the opposite direction to the bus to definitely indicate that traffic moving in both directions on the road is supposed to stop.

It will be noted that the link formed by the fork 18 and the rod 20 may be adjusted as to length by adjusting the threaded end of the rod 20 in the shank 19 to vary the swing of the plate 13 so that this plate will not swing short of or past a position substantially laterally of the vehicle to which it is attached. Bolt 17 is loosely mounted in the opening of the lug 16 to rock relatively thereto to accommodate the vertical swing of the fork 18 as the crank arm 23 moves upwardly and downwardly.

Various modifications and changes in the construction and arrangement of the parts forming the signal may obviously be made and are contemplated, as the drawing and description are only intended to illustrate a preferred embodiment thereof.

I claim as my invention:

1. In a signaling device for motor vehicles, a signaling plate adapted to be hinged at one of its ends to the outer side of a motor vehicle, a shaft extending through said side, cranks keyed to the opposite ends of said shaft, a link pivotally connected to the free end of one of said cranks and to said plate and positioned beneath a dead center when said plate is in an inoperative position, an operating lever disposed on the inner side of said vehicle, and a link connecting said operating lever and the free end of said other crank whereby said signaling plate may be swung outwardly to a position substantially at right angles to the axis of said vehicle, said last mentioned link being disposed beneath its dead center when said plate is in its operative position to retain it in an open position.

2. A signaling device for use with motor buses, said device comprising a plate adapted to be disposed along the outer side of a bus and to be hinged thereto at its forward end, an ear projecting outwardly from said plate adjacent its hinged end, a shaft journaled in the side of said bus and adjacent to the hinged end of said plate, cranks keyed to the opposite ends of said shaft, an adjustable link connected to the free end of one of said cranks and to said ear, an operating lever disposed on the inner side of said bus, and a link connected to said lever and to said other crank for swinging said signaling plate outwardly and forwardly to a position substantially at right angles to the axis of the bus, said last mentioned link being moved past its dead center as the plate is swung to an operative position to retain said plate in an operative position, and said first mentioned link being moved past its dead center when the plate is swung to a closed position to retain it against the outer side of the bus.

CLAUDE E. GAYNON.